United States Patent [19]

Grosch

[11] Patent Number: 4,515,420
[45] Date of Patent: May 7, 1985

[54] STORAGE CONTAINER WITH MOVABLE IDENTIFICATION TABS

[76] Inventor: Peter T. Grosch, 2070 Wharton Rd., Glenside, Pa. 19038

[21] Appl. No.: 507,746

[22] Filed: Jun. 24, 1983

[51] Int. Cl.³ .............................................. A47B 81/06
[52] U.S. Cl. ..................................... 312/12; 312/183; 312/234.1; 312/234.4
[58] Field of Search .................. 312/234, 234.1, 234.2, 312/234.3, 234.4, 10, 11, 12, 14, 183; 40/10 D, 10 R, 376, 379; 403/331, 97, 84, 103

[56] References Cited

U.S. PATENT DOCUMENTS

| | | | |
|---|---|---|---|
| 3,011,235 | 12/1961 | Pacheco | 403/331 |
| 3,238,656 | 3/1966 | Kanzelberger | 312/234.4 |
| 3,753,606 | 8/1973 | Ozeki | 312/183 |
| 4,099,806 | 7/1978 | Savage | 312/234 |
| 4,240,543 | 12/1980 | McKee | 40/10 R |
| 4,339,162 | 7/1982 | Gelardi et al. | 312/14 |

OTHER PUBLICATIONS

NEBS Computer Forms Catalog, Summer 1983, pp. 42 and 43.
Moore Business Forms Catalog, pp. 8, 9, 10 and Additional Unnumbered Page.

Primary Examiner—William E. Lyddane
Assistant Examiner—Joseph Falk
Attorney, Agent, or Firm—Howson and Howson

[57] ABSTRACT

A storage container intended primarily for magnetic data-storage diskettes comprises a box having a series of opposed slots for receiving the diskettes, and a series of flip-up identifying tabs supported on a bar extending across the opening of the box along one edge thereof. The tabs either grasp the bar frictionally, or are provided with inwardly projecting detent ribs which cooperate with flutes in the bar to hold the tabs in their open positions for diskette removal and replacement or in their closed positions. When a tab is moved to its open position, only the diskette corresponding to the tab can be removed from the container. The tabs are designed to carry identifying indicia so that the corresponding diskettes can be readily located.

13 Claims, 15 Drawing Figures

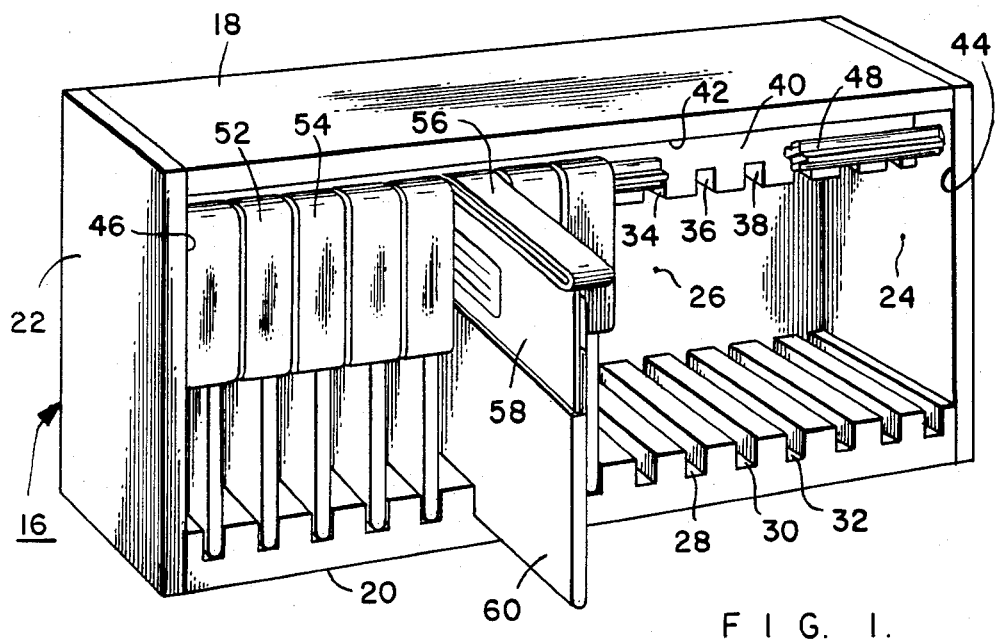
FIG. 1.
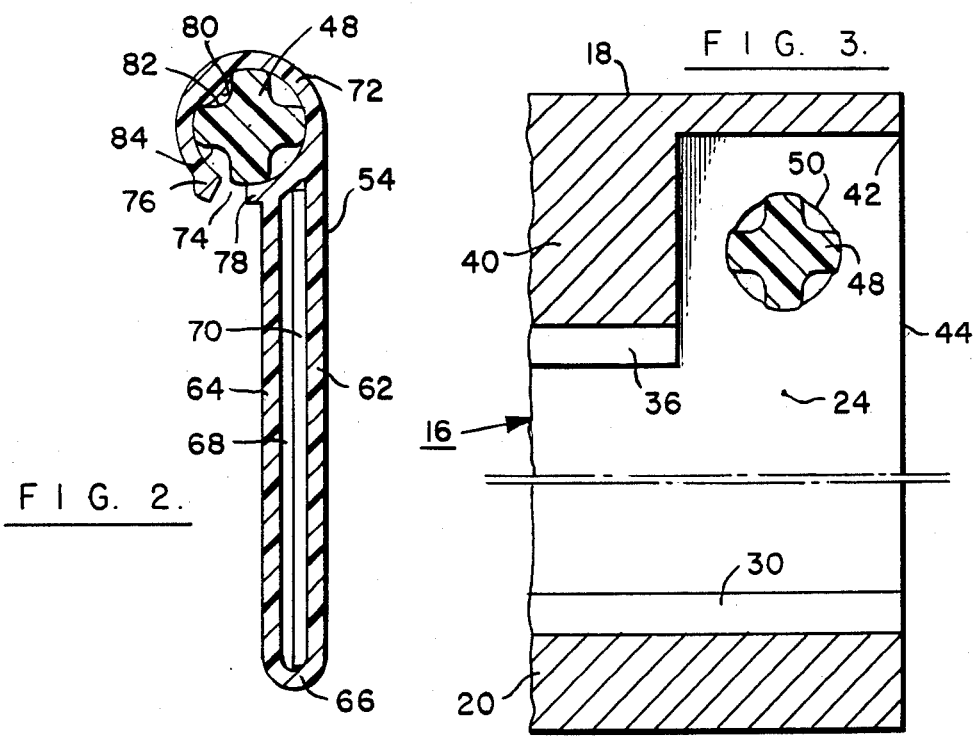
FIG. 2.
FIG. 3.

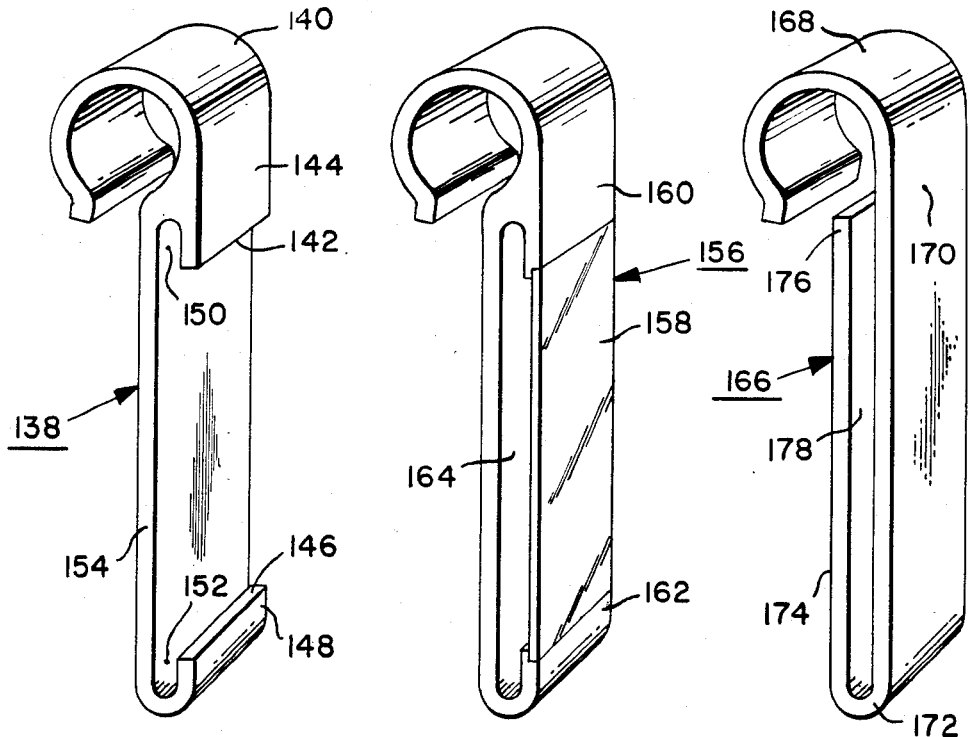
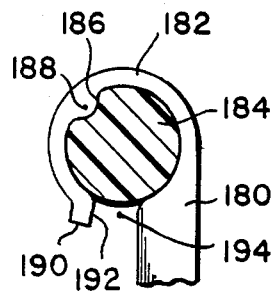
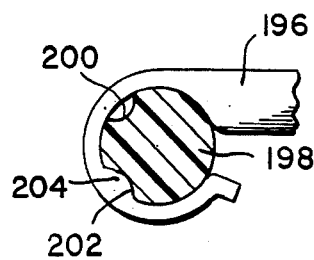
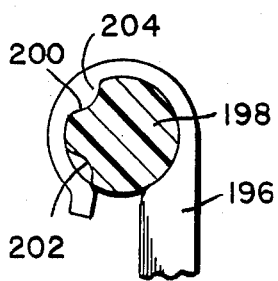
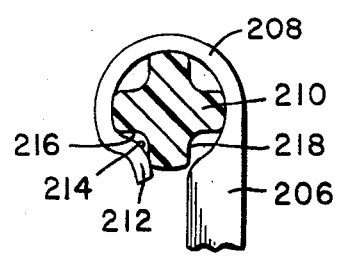
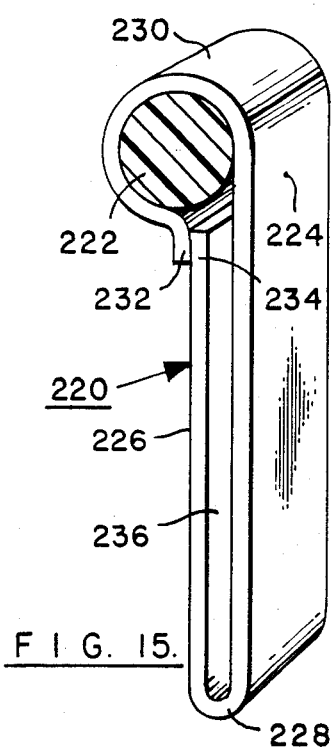

STORAGE CONTAINER WITH MOVABLE IDENTIFICATION TABS

BRIEF SUMMARY OF THE INVENTION

This invention relates to storage containers and more specifically to storage containers for multiple articles such as magnetic data storage diskettes.

With the increasing use of personal computers, stand-alone word processors, and other pieces of equipment which make use of diskettes for storage of data, a need has arisen for storage containers for the diskettes. The user of a stand-alone word processor, for example, may need to keep as many fifty or more diskettes on hand, and should be able to retrieve any desired one of these diskettes readily from its storage container. Typically, the diskettes are stored vertically in bins, and are identified by the labels on the diskettes themselves. To retrieve a desired diskette, the user must search through the bin, moving each diskette manually in order to expose the label on the next diskette behind it to view. Some other storage systems are even more difficult to use. For example, diskettes are frequently stored in folders with multiple pockets. Folder systems are difficult to use particularly where large numbers of diskettes are stored.

Slotted boxes or cabinets are used for the storage of various articles, but have not heretofore been suitable for use in storage of diskettes because they have not allowed for the convenient identification of stored diskettes. In a slotted bin, it is not possible to move each diskette to expose the label on the next diskette, as is the case with an unslotted bin.

The principal object of this invention is to provide a diskette storage device in which the diskettes can be easily and readily identified and retrieved. It is also an object of the invention to provide for the compact storage of large numbers of diskettes and to provide a storage device which is inexpensive, attractive, versatile and easy to use.

In accordance with the invention, a box is provided with means located within it, for holding a plurality of diskettes in side-by-side fashion in the box. Each diskette is held in one of a plurality of predetermined diskette storage positions. The holding means permits movement of the diskettes into and out of the box in directions parallel to two opposed parallel edges of the diskette. The box has an access opening permitting diskettes which are capable of being held by the holding means to be inserted into and withdrawn from the box. Each tab of a series of identifying tabs is associated with one of the predetermined storage positions, and each tab has means for carrying indicia for identifying the diskette belonging in its associated storage position. Means are provided on the box for supporting the tabs so that each tab is movable, independently of the other tabs in the series, from a closed position in which the tab prevents diskettes from being moved into and out of its associated storage position, to an open position in which the tab permits diskettes to be moved into and out of its associated storage position.

In the preferred form of the invention, the tabs are all supported on a tab support bar extending across the access opening of the box. The bar may be fluted and the bar-grasping portions of the tabs provided with ribs adapted to be received in the flutes for detaining the tabs in their open and closed positions.

The invention has the advantage of providing readily visible identification for the subject matter of the diskettes. The identifying matter for all of the diskettes in a particular storage device is visible at the same time. Furthermore, identifying matter can be easily and readily changed. Each tab releases only one diskette when it is moved, and no other diskettes are released. Therefore, even though the diskettes are stored relatively close together, the storage device of the invention gives the user positive assurance that the diskette being retrieved corresponds to the identifying matter on the selected tab (assuming the diskette was initially stored correctly).

The principles of the invention are applicable not only to the storage of magnetic diskettes, but also to the storage of phonorecords, tape cassettes, thin books, paper or plastic file folders, and various other articles having two straight, narrow, opposed parallel edges.

Various objects, advantages and uses of the invention other than those specifically mentioned above will be apparent from the following detailed description when read in conjunction with the drawings.

BRIEF DESCRIPTION OF THE DRAWINGS

FIG. 1 is an oblique perspective view of a storage container in accordance with the invention showing one identifying tab in the open condition, and showing a diskette being removed from the corresponding storage position. A tab support bar is partially broken away to show the upper slots of the storage device more clearly;

FIG. 2 is a vertical section through an identifying tab on a support bar, illustrating one embodiment of the invention;

FIG. 3 is a fragmentary vertical section through the storage container taken on a plane parallel to the slots thereof, showing the positions of the slots and the manner in which the tab support bar is secured to a side wall of the storage container;

FIGS. 8, 9 and 10 are perspective views of three more alternative identifying tabs in accordance with the invention;

FIG. 11 is a fragmentary vertical section showing the cooperation of a tab with a tab support bar having a single flute, the tab being shown in the closed position;

FIG. 12 is a fragmentary vertical section showing a tab in the open position on a support bar having two flutes;

FIG. 13 is a fragmentary vertical section showing the tab of FIG. 12 in its closed position;

FIG. 14 is a fragmentary vertical section showing an alternative form of tab in cooperation with a support bar having four flutes; and FIG. 15 is a perspective view showing a further alternative form of tab in cooperation with a circular support bar.

DETAILED DESCRIPTION

Figure 4:
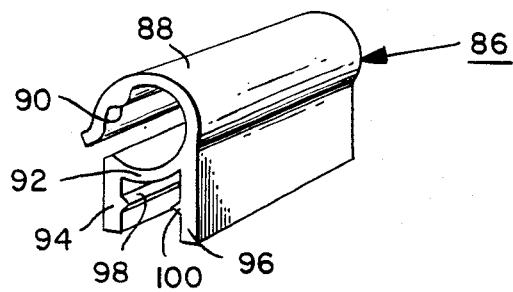
FIG. 4 is a perspective view of the bar-grasping part of a two-part identifying tab.

Referring to FIGS. 1 and 3, the storage container 16 comprises a top wall 18, a bottom wall 20, side walls 22 and 24, and a rear wall 26. The upwardly facing side of bottom wall 20 is provided with a series of parallel, uniformly spaced slots, including slots 28, 30 and 32.

These slots extend from the rear wall to the front opening of the box. On the underside of upper wall 18, a similar series of slots is provided, including slots 34, 36 and 38. Each slot of the lower series has a corresponding slot in the upper series directly above it. The spacing between the upper and lower slots is such as to accommodate the article to be stored so that its upper edge is held in one of the upper slots, while its lower edge is held in the corresponding lower slot. The upper slots are formed in a part 40 of upper wall 18, part 40 being set back from front edge 42 of wall 18, as shown in FIG. 3. The front opening of the box is defined by edge 42 of top wall 18, edges 44 and 46 of side walls 24 and 22, and the front edges of the slot structure in lower wall 20.

The set back position of upper wall part 40 provides a space for tab support bar 48. Bar 48 has four flutes, and is press fit or glued into holes in side wall 24 and 22, the hole in side wall 24 being indicated at 50 in FIG. 3. It is important to prevent the support bar from rotating in the holes in which it is held. On support bar 48 there is provided a series of tabs, including tabs 52, 54 and 56. These tabs serve as identification tabs for diskettes held in the slots of the storage container. One tab is provided for each pair of corresponding upper and lower slots. Preferably, a sufficient number of tabs is provided to occupy the entire width of the access opening. The tabs are then prevented from sliding along the support bar. The size of the tabs is such that each tab is centered on a corresponding upper slot.

In order to remove or replace a diskette, the tab corresponding to the diskette is flipped upwardly into a horizontal position. Tab 56 is shown in its horizontal position. A diskette 58 in a diskette envelope 60 is shown being removed from the storage position corresponding to identification tab 56.

A typical tab 54 is shown in cross-section in FIG. 2. The tab can be formed from a wide variety of materials, but is preferably made from polyvinyl chloride, polystyrene, polycarbonate or a similar material. The tab material may be either clear or colored, but in either case it should be transparent. Tab 54 comprises a front part 62, and a rear part 64 connected to part 62 at the bottom by a return bend 66. Between these two parts is a vertically elongated space 68 which is preferably open on both sides of the tab for the insertion and removal of an identifying card 70. The identifying card 70 is frictionally held between the upper and lower ends of space 68, and carries identifying indicia for the particular storage position with which it is associated. At the upper end of the tab, and connected to both the front part 62 and the rear part 64 of the tab, is a bar-grasping loop 72 which, in the case of FIG. 2, surrounds the bar almost completely, there being a small gap 74 between the free end 76 of the loop and element 78 at the upper end of tab part 64. Loop 72 must be resilient, because it is provided with a projection 80 which enters one or the other of flutes 82 ad 84 of bar 48. In FIG. 2, projection 80 is located in flute 82 of the bar, and the tab is in its vertical or closed position. If the lower end of the tab is manually grasped and the tab is flipped upwardly by rotating it counterclockwise as viewed in FIG. 2, projection 80 is cammed out of flute 82, and gap 74 widens momentarily until projection 80 enters flute 84. Either the projection or the flutes or both should be shaped so that a corresponding camming action takes place as projection 80 moves out of flute 82 toward flute 84, and as it moves out of flute 84 toward flute 82. In the case of FIG. 2, projection 82 has a gradual camming slope on both sides, and the formation of the flutes is such that they also have a camming effect when the tab is moved in both directions.

The engagement of the projection with the flutes is such that, when the tab is flipped up to its horizontal position, it remains in that position against the force of gravity. The tab also remains in its vertical or closed position by virtue of engagement of the tab projection with flute 82. A small but significant manually applied force is sufficient to move the tab from one position to the other.

FIG. 4 shows the grasping section 86 of a two-piece tab consisting of a grasping section and a removable, indicia-carrying element. Grasping section 86 comprises a resilient loop 88 having an inwardly projecting rib 90 for engaging the flute or flutes of a fluted tab support bar. The bottom part 92 of the loop has depending elements 94 and 96, element 94 having a rib 98 facing a corresponding rib 100 of element 96. These ribs engage mating grooves in the removable indicia-carrying element.

Figure 5:
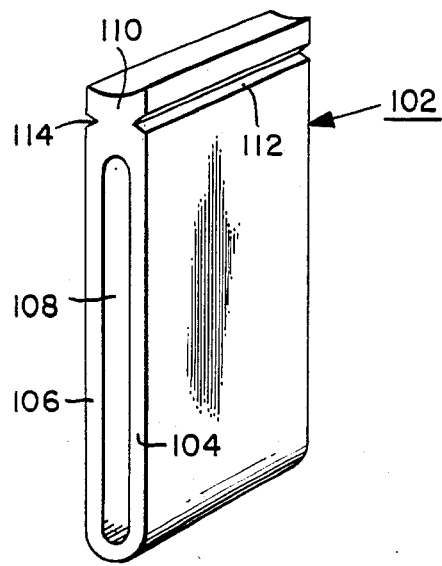
FIGS. 5, 6 and 7 are perspective views of three alternative identifying tab parts cooperable with the bar-grasping part shown in FIG. 4.

One such indicia-carrying element is element 102 in FIG. 5. This element consists of a front wall 104, and a rear wall 106 spaced from each other to provide a card-receiving slot 108. The upper portion 110 of element 102 is provided with grooves 112 and 114 on its opposite sides positioned to receive ribs 100 and 98 respectively of grasping section 86 so that the grasping section and the indicia-carrying element can be engaged and disengaged by a sliding action.

Figure 6:
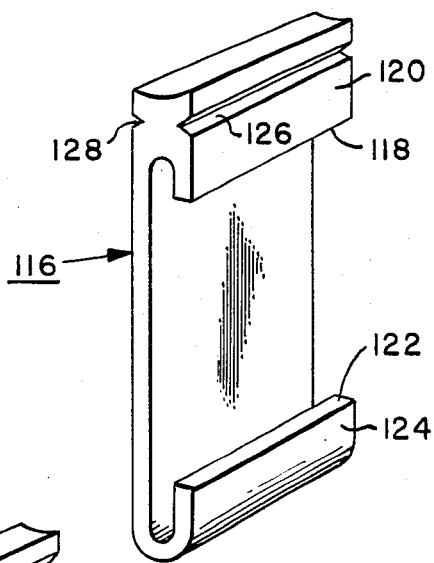

FIG. 6 shows an alternative removable indicia-carrying element 116 which is similar to element 102 except that its front wall is open throughout the greater portion of its height, from edge 18 of depending part 120 and edge 122 of upstanding part 124. Grooves are provided at 126 and 128 for engagement with the ribs of grasping section 86. An indicia-carrying card can easily be placed in or removed from element 116, the upper end of the card being held behind part 120, and the lower end of the card being held behind part 122. Indicia-carrying element 116 need not be transparent as is the case with element 102.

Figure 7:
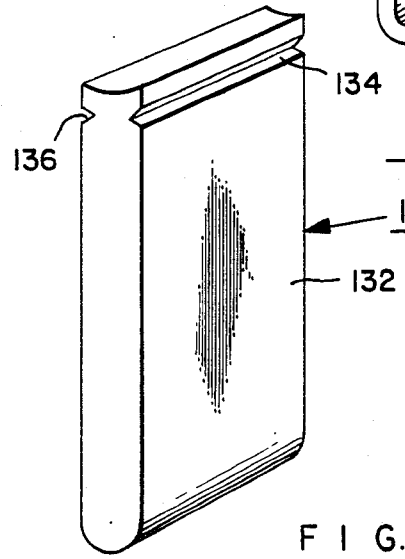

FIG. 7 shows a solid indicia-carrying element 130 consisting of a body 132 having grooves 134 and 136 near its upper end. These grooves are positioned to receive ribs 100 and 98 respectively of grasping section 86. Identifying indicia can be permanently affixed to the front face of body 132 if it is opaque, or to either face of the body if it is transparent. The indicia may be etched in the body, or affixed to the body by adhesive labels or transfer lettering. The body can be provided with an appropriate surface on which information can be written, and the writing surface can be made erasable using known methods and materials.

The separability of the indicia-carrying elements from the support bar-grasping element facilitates changing identifying information, particularly in the case of the indicia-carrying element of FIG. 7. The two-piece construction of the tabs, however, is more important from the standpoint of ease of manufacture. The grasping section of FIG. 4 and the indicia-carrying elements of FIGS. 5, 6 and 7 are easier to extrude than is a unitary tab of the kind shown in FIG. 2.

FIG. 8 shows a unitary tab 138 comprising a bar-grasping section 140 having a front opening extending between edge 142 of depending front portion 144 and edge 146 of upstanding front portion 148. Cards carrying identifying indicia are held in grooves 150 and 152 behind the depending and upstanding front portions of the tab and in front of rear wall 154. The design of tab 138 is suitable for die casting. Thus, the part can be produced in metals such as zinc or aluminum as well as in synthetic resin materials.

Tab 156 of FIG. 9 is similar to tab 138 except that it is provided with a transparent window 158 extending between depending front wall portion 160 and upstanding front wall portion 162. If an indicia-carrying card is placed in slot 164 behind window 158, it will be visible through the window, and protected thereby.

Tab 166 of FIG. 10 is of a design suitable for manufacture by heat-forming of transparent sheet material. This tab comprises a support bar-grasping loop 168, a front section 170, a return bend 172, and a rear section 174 having a free upper end 176. The rear section is spaced from the front section by a card-receiving slot 178.

The grasping loops of the tabs of FIGS. 8, 9 and 10 are not provided with detent ribs. Rather, these grasping loops are designed to hold a circular bar frictionally. It is, of course, possible to provide these loops with detent means for holding the tabs in either or both of their open and closed positions.

FIG. 11 shows a tab having a body 180 and a loop 182 grasping a bar 184. This bar has only a single flute 186 which is shown engaged by inwardly projecting rib 188 of the grasping loop. The grasping loop is sufficiently resilient that when the tab is moved to its open position, rib 188 moves out of flute 186 and bears frictionally against an unfluted part of bar 184 until the tab is returned to its closed position. End 190 of loop 182 is bent outwardly to provide a camming surface 192 facing space 194 between the end of the loop and tab body 180. Preferably, the size of this space and the resilience of the loop material are chosen to permit the loop to be snapped over the bar for installation thereon. This avoids the necessity of removing the bar from the box and sliding tabs onto it in order to replace a damaged tab. This construction is especially desirable where the bar is press-fit or glued into holes in the side wall of the box, or otherwise secured to the side walls in such a way as to prevent it from rotating as the tabs are flipped up and down. In this construction, the grasping loop should extend somewhat more than half-way around the support bar so that it is securely held thereon as the tab is flipped up and down. The grasping loop, however, should not extend so far around the bar as to prevent the tab from being readily snapped onto the bar in its initial installation or in the process of replacing a damaged tab.

The snap-on construction is applicable not only to the tab of FIG. 11, but also to a variety of tabs, including any of the tabs in FIGS. 2 and 4–14.

FIG. 12 shows a tab 196 in its open position on a support bar 198. The support bar has two flutes, 200 and 202, which are 90 degrees apart. A detent rib 204 projecting inwardly from the loop of the tab is engaged in flute 202 to hold the tab in its open condition. FIG. 13 shows the same tab in its closed condition with detent rib 204 engaged in flute 200.

FIG. 14 shows a tab having a body 206 and a modified form of bar-grasping loop 208 on a bar 210 having four flutes. Free end 212 of the grasping loop is bent inwardly in such a way as to form an inwardly convex detent surface 214 which cooperates with flute 216 to hold the tab in its closed position. When the tab is opened, surface 214 engages flute 218 of the support bar. While the detent ribs of FIGS. 11, 12 and 13 are preferably formed by extrusion, the form of detent in the tab of FIG. 14 can be made from sheet material using a heat forming process.

FIG. 15 shows a tab 220 which is held frictionally on a circular cylindrical support bar 222. The tab comprises a front wall 224 and a rear wall 226 connected by a return bend 228. Bar-grasping loop 230 is provided at the upper end of front wall 224. The free end of loop 230 extends downwardly and engages the rearwardly facing surface of the upper end 234 of rear wall 226, thereby preventing the rear wall from spreading away from the front wall and enlarging card-holding space 236 between the walls. The resilience and size of the loop should be such as to insure that the loop grasps the support bar with sufficient tightness to hold the tab when it is moved either to its open or its closed positions. At the same time, the loop should be designed so that its free end 232 always remains in engagement with upper end 234 of rear tab wall 226. The tab design illustrated in FIG. 15 is suitable for manufacture by a heat forming process.

One advantage of the identifying tab construction in accordance with the invention is that, when a tab is flipped up, only the desired diskette is removable from the storage container. It also provides positive assurance that the diskette will be returned to the position corresponding to the information on the tab. All of this is accomplished without the need for partitions between diskettes within the container or for partitions between the tabs themselves.

In all cases, whether the tabs are held frictionally on the support bar or provided with detents for engaging flutes on the support bar, the degree of friction or the force required to disengage a detent should be such as to prevent the movement of one tab from causing movement of either of its adjacent tabs, even though adjacent tabs may be in direct contact with each other.

Various modifications can be made to the apparatus described above. For example, the box can be arranged with its opening at the top so that diskettes are moved upwardly for removal. The box can be in the form of a drawer in a desk pedestal or in a cabinet or other article of furniture. The box can be provided with a closure which encloses not only the diskettes but also the identifying tabs. The closure can be hinged, for example, to bottom wall 20, or to top wall 18 of the box (FIG. 1). The tab support bar can be either along the top or along the bottom of the opening. Desirably, although not necessarily, the door is hinged along the edge of the access opening at which the tab support bar is positioned. In this way, closing of the door automatically moves any open tabs to their closed positions. Furthermore, with this configuration, the tabs cannot be damaged by the closing of the door. The door can be provided with locking means, if desired so that it serves not only to prevent the entry of dust, but also to secure the contents of the box against unauthorized removal.

The tabs can be designed to be removed and replaced on the support bar by sliding them longitudinally on the bar after removal thereof from the box, or, more conveniently, they can be designed to snap onto the bar for easy replacement of damaged tabs. While the detents described herein are in the form of inwardly projecting ribs on the grasping loops of the tabs for cooperation with flutes on the support bars, the detents could alternatively be in the form of grooves in the grasping loops designed to cooperate with longitudinal ribs projecting outwardly from the support bars. The tabs can be made from a wide variety of materials such as metal and synthetic resins, although synthetic resins are preferred because of the generally higher resiliency of properly formulated synthetic materials. The tabs can be manufactured by any of a variety of available processes, including injection molding, extrusion, and heat forming of sheet material.

The storage device may be modified in its size and in the relative dimensions of its parts in order to accommodate articles such as phonorecords, tape cassettes, books, file folders and the like.

Any of the tabs can be provided with an erasable writing surface, thereby eliminating the need for insertable, indicia-carrying cards.

Various other modifications may be made without departing from the scope of the invention as defined in the following claims.

I claim:

1. A storage container for multiple articles which have two straight, narrow, opposed parallel edges, such as magnetic storage diskettes, audio cassettes, phonorecords and the like, comprising:
   a box;
   means within the box for holding a plurality of said articles in side-by-side fashion in said box, with each article in one of a plurality of predetermined article storage positions, said holding means permitting movement of said articles into and out of the box in directions parallel to said opposed parallel edges;
   said box having an access opening permitting articles which are capable of being held by said holding means to be inserted into and withdrawn from the box;
   a series of tabs, each tab being associated with one of said predetermined article storage positions, and each tab having means for carrying indicia for identifying the article belonging in its associated article storage position;
   means on said box for supporting said tabs so that each tab is movable, independently of the other tabs in the series, from a closed position in which the tab prevents articles from being moved into and out of its associated article storage position, to an open position in which the tab permits articles to be moved into and out of its associated article storage position;
   a bar fixed to the box and extending across said access opening in a direction perpendicular to the plane defined by said two opposed parallel edges of each article when stored in the box, each of the tabs in the series having means grasping said bar and being swingable thereon from its closed position to its open position; and
   cooperable means, on the grasping means of said tabs and on said bar, for retaining said tabs in one of their closed and open positions until said tabs are forcibly moved therefrom manually.

2. A storage container according to claim 1 in which the box has two opposed interior walls, and in which the holding means comprises a first series of slots formed on one of said walls on the side thereof facing the interior of the box and a second series of slots formed on the other of said walls on the side thereof facing the interior of the box.

3. A storage container according to claim 1 in which said cooperable means comprises detent means on the bar extending along the length thereof and cooperating detent means on the grasping means of each tab, one of said detent means being a flute and the other detent means being a projection of a size, shape and position such that it is capable of entering the flute when the tab is in one of its closed and open positions, and at least one of said detent means having a cam surface positioned to cause the projection to disengage the flute when the tab is moved from said one of its closed and open positions to the other of said positions, and the grasping means being sufficiently resilient to allow the projection to disengage the flute when the tab is forcibly moved manually from said one of its closed and open positions to the other of said positions.

4. A storage container according to claim 1 in which said cooperable means comprises a flute on the bar extending along the length thereof, and a projection on the grasping means of each tab, said projection being of a size, shape and position such that it is capable of entering the flute when the tab is in its open position, at least one of said flute and projection having a cam surface positioned to cause the projection to move out of the flute when the tab is moved from its open position toward its closed position, and said grasping means being sufficiently resilient to allow its projection to be cammed out of the flute when the tab is forcibly moved away from its open position manually.

5. A storage container according to claim 1 in which the cooperable means, on the grasping means of said tabs and on said bar, retain said tabs in their closed and open positions until said tabs are forcibly moved therefrom manually.

6. A storage container according to claim 1 in which the indicia-carrying means of each tab comprises means for removably retaining a card on said tab in a position such that printed matter on the card is visible at least when the tab is in its closed position.

7. A storage container according to claim 1 in which the indicia-carrying means of each tab comprises front and back elements having a card-retaining space between them, the front element being transparent and being positioned so that a card in said space is visible through the transparent front element at least when the tab is in its closed position.

8. A storage container according to claim 1 in which the bar-grasping means and the indicia-carrying means of each tab are connected to each other by interfitting ribs and grooves whereby the indicia-carrying means of each tab can be removed from the bar-grasping means thereof.

9. A storage container according to claim 1 in which the grasping means of each tab is resilient and grasps the bar frictionally.

10. A storage container according to claim 1 in which the box has opposed side walls parallel to the planes defined by the two opposed parallel edges of each article, and in which the bar is press fit into holes in said side walls.

11. A storage container according to claim 3 in which the box has side walls parallel to the planes defined by the two opposed parallel edges of each article, and in which the bar is press fit into holes in said side walls.

12. A storage container for multiple articles which have two straight, narrow, opposed parallel edges, such as magnetic storage diskettes, audio cassettes, phonorecords and the like, comprising:
   a box;

means within the box for holding a plurality of said articles in side-by-side fashion in said box, with each article in one of a plurality of predetermined article storage positions, said holding means permitting movement of said articles into and out of the box in directions parallel to said opposed parallel edges;

said box having an access opening permitting articles which are capable of being held by said holding means to be inserted into and withdrawn from the box;

a series of tabs, each tab being associated with one of said predetermined article storage positions, and each rib having means for carrying indicia for identifying the article belonging in its associated article storage position;

means on said box for supporting said tabs so that each tab is movable, independently of the other tabs in the series, from a closed position in which the tab prevents articles from being moved into and out of its associated article storage position, to an open position in which the tab permits articles to be moved into and out of its associated article storage position; and a bar extending across said access opening in a direction perpendicular to the planes defined by said two opposed parallel edges of each article when stored in the box, each tab having means for grasping said bar and being swingable thereon from its closed position to its open position;

in which each tab comprises a sheet of synthetic resin material with its indicia-carrying means having spaced front and rear sections connected by a return bend at the end of the tab remote from the bar and with its bar-grasping means in the form of a loop extending from the end of the front section remote from the return bend and around the bar, said bar-grasping means having a free end in contact with the end of the rear section of the indicia-carrying means remote from the return bend, and thereby preventing the spreading of the front and rear sections of the indicia-carrying means away from each other.

13. A storage container for multiple articles which have two straight, narrow, opposed parallel edges, such as magnetic storage diskettes, audio cassettes, phonorecords and the like, comprising:

a box;

means within the box for holding a plurality of said articles in side-by-side fashion in said box, with each article in one of a plurality of predetermined article storage positions, said holding means permitting movement of said articles into and out of the box in directions parallel to said opposed parallel edges;

said box having an access opening permitting articles which are capable of being held by said holding means to be inserted into and withdrawn from the box;

a series of tabs, each tab being associated with one of said predetermined article storage positions, and each tab having means for carrying indicia for identifying the article belonging in its associated article storage position; and means on said box for supporting said tabs so that each tab is movable, independently of the other tabs in the series, from a closed position in which the tab prevents articles from being moved into and out of its associated article storage position, to an open position in which the tab permits articles to be moved into and out of its associated article storage position;

in which the box has two opposed interior walls and in which the holding means comprises a first series of slots formed on one of said walls on the side thereof facing the interior of the box and a second series of slots formed on the other of said walls on the side thereof facing the interior of the box, and having a bar extending across said access opening in a direction perpendicular to the planes defined by said two opposed parallel edges of each article when stored in the box, each tab having means for grasping the bar and being swingable thereon from its closed position to its open position, the bar being located adjacent to the ends of the first series of slots nearest the access opening but in a position to provide clearance for the insertion and removal of the articles through the access opening, the first series of slots formed on one of said walls being formed in a part of said wall which is recessed inwardly from said access opening, and said bar being positioned in the recess provided thereby.

* * * * *

UNITED STATES PATENT AND TRADEMARK OFFICE
CERTIFICATE OF CORRECTION

PATENT NO. : 4,515,420
DATED : May 7, 1985
INVENTOR(S) : Peter T. Grosch

It is certified that error appears in the above—identified patent and that said Letters Patent are hereby corrected as shown below:

Column 9, line 15, "rib" should be --tab--.

Signed and Sealed this

Twentieth Day of August 1985

[SEAL]

Attest:

DONALD J. QUIGG

Attesting Officer     Acting Commissioner of Patents and Trademarks